US012078940B2

(12) United States Patent
Hayamizu et al.

(10) Patent No.: US 12,078,940 B2
(45) Date of Patent: Sep. 3, 2024

(54) DEVELOPING DEVICE AND IMAGE FORMING APPARATUS

(71) Applicant: FUJIFILM Business Innovation Corp., Tokyo (JP)

(72) Inventors: Kenji Hayamizu, Kanagawa (JP); Masayuki Shimoda, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/960,157

(22) Filed: Oct. 5, 2022

(65) Prior Publication Data

US 2023/0305429 A1 Sep. 28, 2023

(30) Foreign Application Priority Data

Mar. 24, 2022 (JP) ................................ 2022-049082

(51) Int. Cl.
*G03G 15/08* (2006.01)

(52) U.S. Cl.
CPC ................................ *G03G 15/0808* (2013.01)

(58) Field of Classification Search
CPC .................................................. G03G 15/0808
See application file for complete search history.

(56) References Cited

U.S. PATENT DOCUMENTS 5,768,666 A * 6/1998 Ito .......................... G03G 15/09 399/272
5,771,429 A * 6/1998 Oyama .................. G03G 15/09 399/260
5,995,790 A * 11/1999 Takeda ................... G03G 15/09 399/272
6,229,978 B1 * 5/2001 Naito ..................... G03G 15/09 399/272
2002/0141777 A1 * 10/2002 Kamimura ......... G03G 15/0817 399/103
2014/0023408 A1 * 1/2014 Kato .................. G03G 15/0818 399/269
2015/0086247 A1 * 3/2015 Yoshimoto ......... G03G 15/0921 399/277
2017/0357186 A1 * 12/2017 Hori ................... G03G 15/0893

FOREIGN PATENT DOCUMENTS

JP 2012181485 9/2012

* cited by examiner

*Primary Examiner* — Sevan A Aydin
(74) *Attorney, Agent, or Firm* — JCIPRNET

(57) ABSTRACT

A developing device includes: a rotating member that delivers a developer to a latent image of an image holding body while rotating; a supply member that extends in an axial direction of the rotating member and is disposed diagonally below the rotating member as viewed from the axial direction, transports the developer while rotating, and supplies the developer to the rotating member; and an upper member disposed on an opposite side of the rotating member with respect to a tangent line extending in an upward-downward direction in contact with a portion of the rotating member on a supply member side and above the supply member, as viewed from the axial direction.

20 Claims, 11 Drawing Sheets

DEVELOPING DEVICE AND IMAGE FORMING APPARATUS

CROSS-REFERENCE TO RELATED APPLICATIONS

This application is based on and claims priority under 35 USC 119 from Japanese Patent Application No. 2022-049082 filed Mar. 24, 2022.

BACKGROUND

(i) Technical Field

The present invention relates to a developing device and an image forming apparatus.

(ii) Related Art

A developing device described in JP2012-181485A is a developing device having a supply-collection separation type, in which the developing device has a shielding member extending from an end portion (tip of separation plate) facing a surface of a developing roll in the separation plate which separates a developer supply transport path A and a developer collection transport path B to be interposed between an upper surface of the tip portion of the separation plate (inner wall surface portion serving as an inner wall surface of the developer collection transport path) and the surface of the developing roll, and an upper surface of the shielding member is tilted downward toward the developer collection transport path.

SUMMARY

The developing device includes a rotating member that delivers a developer to a latent image of an image holding body while rotating, and a supply member that is disposed diagonally below with respect to the rotating member and transports the developer while rotating to supply the developer to the rotating member.

The developer that is not delivered to the image holding body and remains on the rotating member returns to the supply member side, is released from the rotating member, and scatters to the supply member side by a centrifugal force of the rotating member. Here, the released developer collides with the developer transported by the supply member, and cloud toner is generated.

Aspects of non-limiting embodiments of the present disclosure relate to a developing device and an image forming apparatus that reduce the amount of generated cloud toner, as compared with a case where there is only a space between a rotating member and a supply member.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a developing device including: a rotating member that delivers a developer to a latent image of an image holding body while rotating; a supply member that extends in an axial direction of the rotating member and is disposed diagonally below the rotating member as viewed from the axial direction, transports the developer while rotating, and supplies the developer to the rotating member; and an upper member disposed on an opposite side of the rotating member with respect to a tangent line extending in an upward-downward direction in contact with a portion of the rotating member on a supply member side and above the supply member, as viewed from the axial direction.

BRIEF DESCRIPTION OF THE DRAWINGS

Exemplary embodiment(s) of the present invention will be described in detail based on the following figures, wherein.

DETAILED DESCRIPTION

Examples of an image forming apparatus according to exemplary embodiments of the present invention will be described with reference to FIGS. 1 to 11. An arrow H illustrated in each diagram is a vertical direction and indicates an apparatus upward-downward direction, an arrow W is a horizontal direction and indicates an apparatus width direction, and an arrow D is the horizontal direction and indicates an apparatus depth direction.

Overall Configuration of Image Forming Apparatus 10

Figure 1:
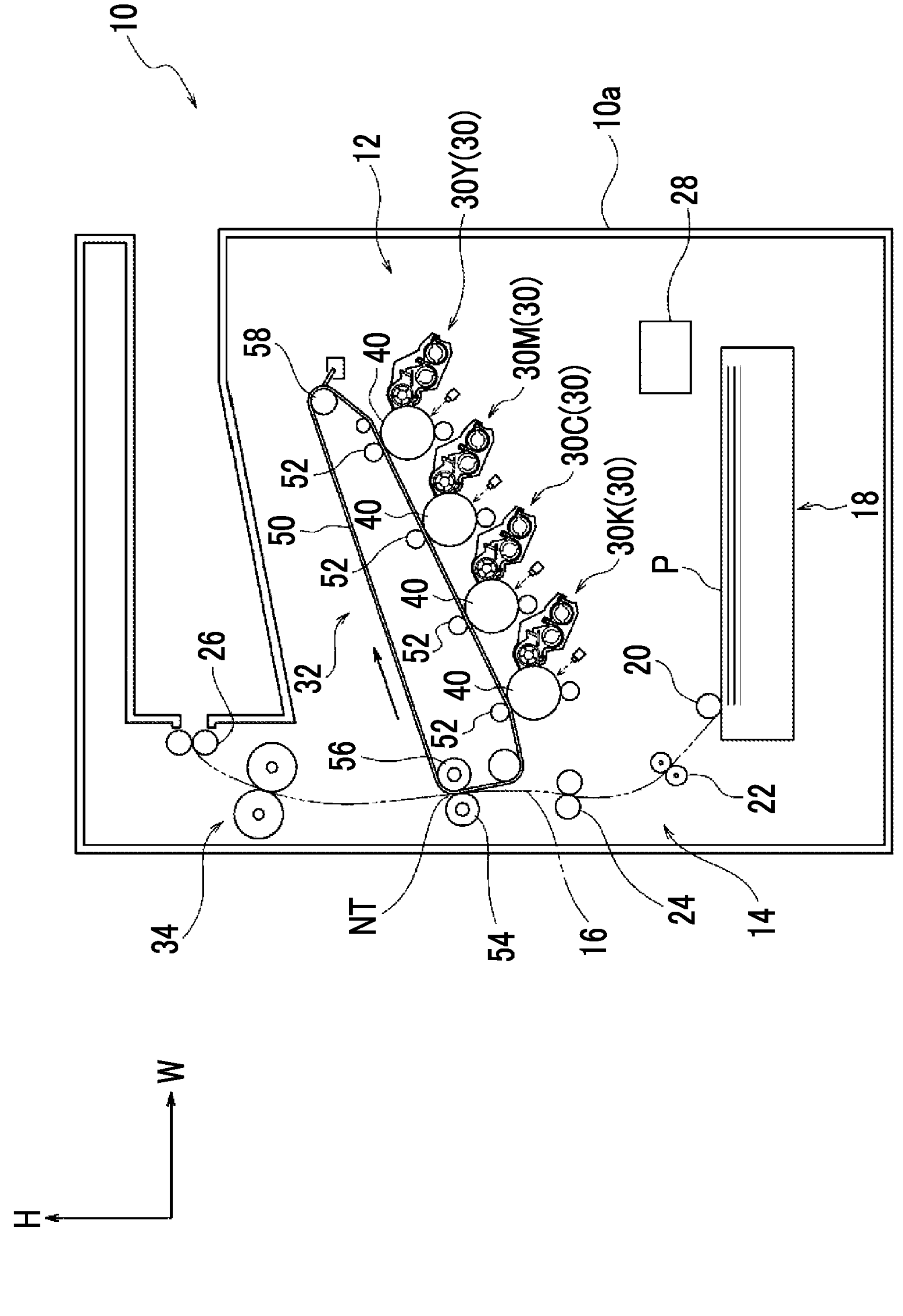
FIG. 1 is a schematic configuration diagram illustrating an image forming apparatus according to an exemplary embodiment of the present disclosure.

As illustrated in FIG. 1, an image forming apparatus 10 includes an image forming portion 12 that forms a toner image by an electrophotographic method, and a transport portion 14 that transports a sheet member P as a recording medium along a transport path 16. Further, the image forming apparatus 10 includes a housing member 18 accommodating the sheet member P and a control portion 28 that controls the entire apparatus.

In the image forming apparatus 10 having the configuration described above, the sheet member P accommodated in the housing member 18 is transported by the transport portion 14 along the transport path 16. Further, the toner image formed by the image forming portion 12 is formed on the sheet member P to be transported, and the sheet member P on which the toner image is formed is output to an outside of an apparatus main body 10*a*.

Image Forming Portion 12

As illustrated in FIG. 1, the image forming portion 12 includes a plurality of toner image forming portions 30 that form each toner image of each color, and a transfer portion 32 that transfers the toner image formed by the toner image forming portion 30 to the sheet member P. Further, the image forming portion 12 includes a fixing device 34 that fixes the toner image transferred to the sheet member P by the transfer portion 32 to the sheet member P.

Toner Image Forming Portion 30

The plurality of toner image forming portions 30 are provided to form a toner image for each color. The present exemplary embodiment provides toner image forming portions 30Y, 30M, 30C, and 30K having a total of four colors of yellow (Y), magenta (M), cyan (C), and black (K). In the following description, in a case where it is not necessary to distinguish between yellow (Y), magenta (M), cyan (C), and black (K), Y, M, C, and K attached to the reference numerals are omitted.

Figure 2:
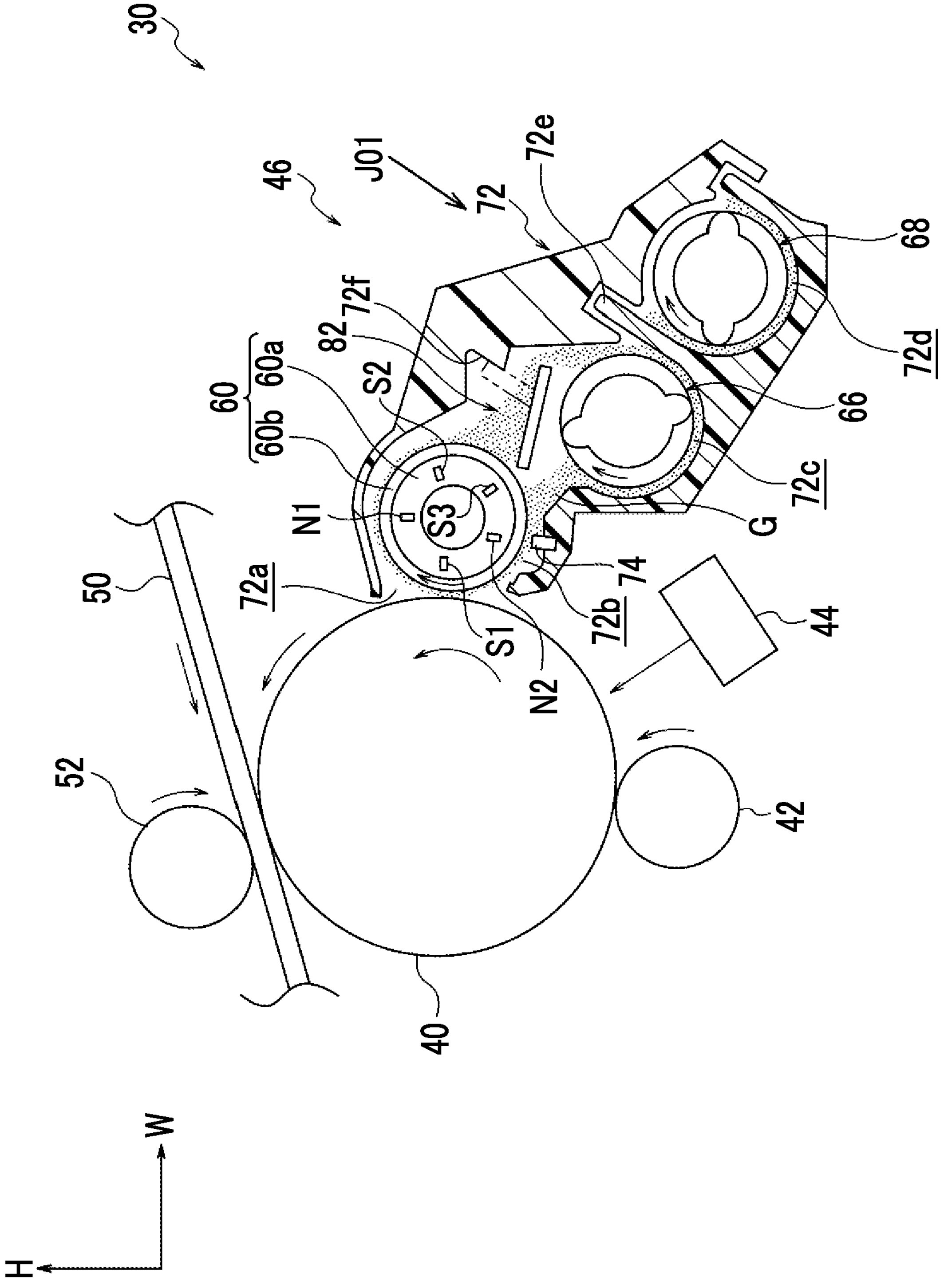
FIG. 2 is a cross-sectional view illustrating a developing device according to the exemplary embodiment of the present disclosure.

The toner image forming portion 30 of each color is basically configured in the same manner except for a toner to be used, and as illustrated in FIG. 2, a rotating cylindrical image holding body 40 and a charger 42 that charges the image holding body 40. Further, the toner image forming portion 30 includes an exposure device 44 that irradiates the charged image holding body 40 with exposure light to form an electrostatic latent image and a developing device 46 that develops the electrostatic latent image by using a developer G containing a toner as a toner image. Therefore, the toner image forming portion 30 of each color forms an image of each color by using the toner of each color. Details of the developing device 46 will be described below.

Further, as illustrated in FIG. 1, the image holding body 40 of each color is in contact with a transfer belt 50 (details will be described later) that moves around. In a circumference direction of the transfer belt 50 (see the arrow in FIG. 1), the toner image forming portions 30 of yellow (Y), magenta (M), cyan (C), and black (K) are arranged side by side in this order from the upstream side.

Transfer Portion 32

As illustrated in FIG. 1, the transfer portion 32 includes the transfer belt 50 and primary transfer rolls 52 that are respectively disposed on an opposite side of the image holding body 40 of each color with the transfer belt 50 interposed therebetween and transfer a toner image formed on the image holding body 40 of each color to the transfer belt 50.

Further, the transfer portion 32 includes a winding roll 56 around which the transfer belt 50 is wound, and a drive roll 58 around which the transfer belt 50 is wound and which transmits the rotational force to the transfer belt 50. Therefore, the transfer belt 50 orbits in an arrow direction in FIG. 1.

Further, the transfer portion 32 is disposed on an opposite side of the winding roll 56 with the transfer belt 50 interposed therebetween, and includes a secondary transfer roll 54 that transfers the toner image transferred to the transfer belt 50 to the sheet member P. The transfer nip NT that transfers the toner image to the sheet member P is formed between the secondary transfer roll 54 and the transfer belt 50.

In this configuration, the toner image is primarily transferred to the transfer belt 50 by the primary transfer roll 52 in order of yellow (Y), magenta (M), cyan (C), and black (K). In addition, the toner image is transferred from the transfer belt 50 to the sheet member P interposed and transported between the transfer belt 50 and the secondary transfer roll 54 by the secondary transfer roll 54. Further, the sheet member P to which the toner image is transferred is transported toward the fixing device 34.

Fixing Device 34

As illustrated in FIG. 1, the fixing device 34 is disposed on a downstream side of a transfer nip NT in a transport direction of the sheet member P. The fixing device 34 heats and pressurizes a toner image transferred to the sheet member P to fix the toner image to the sheet member P.

Transport Portion 14

As illustrated in FIG. 1, the transport portion 14 includes a sending roll 20 that sends the sheet member P accommodated in the housing member 18 to the transport path 16 and a prevention roll 22 that prevents over-feeding of the sheet member P to be sent out by the sending roll 20. Further, the transport portion 14 includes an adjustment roll 24 that adjusts a timing of the sheet member P to be sent to the transfer nip NT, and an output roll 26 that outputs the sheet member P on which a toner image is fixed by the fixing device 34 to the outside of the apparatus main body 10*a*.

Central Portion Configuration

Next, the developing device 46 will be described.

As illustrated in FIG. 2, the developing device 46 includes a housing 72, a developing roll 60 disposed to face the image holding body 40, a supply auger 66 for supplying a developer G to the developing roll 60, and an agitating auger 68 for agitating the developer G. The developing roll 60 is an example of a rotating member, and the supply auger 66 is an example of a supply member.

Further, the developing device 46 includes a restraining member 80 disposed above the supply auger 66. The developer G is a two-component developer G including toner T and magnetic carrier particles (hereinafter, referred to as "carrier C") as main components.

Housing 72

As illustrated in FIG. 2, the housing 72 is disposed next to the image holding body 40, and an opening portion 72*a* that opens an inside of the housing 72 is formed to extend in the apparatus depth direction at a portion of the housing 72 facing the image holding body 40.

In addition, in the housing 72, a delivery path 72*b* in which the developing roll 60 is disposed is formed to extend in the apparatus depth direction, on an opposite side of the image holding body 40 with the opening portion 72*a* interposed therebetween. Further, in the housing 72, a supply path 72*c* in which the supply auger 66 is disposed is formed to extend diagonally below the delivery path 72*b* in the apparatus depth direction. In addition, in the housing 72, an agitating path 72*d* in which the agitating auger 68 is disposed is formed on an opposite side of the delivery path 72*b* with the supply path 72*c* interposed therebetween so as to extend in the apparatus depth direction. Further, in the housing 72, a partition wall 72*e* that separates the supply path 72*c* and the agitating path 72*d* is formed between the supply path 72*c* and the agitating path 72*d*.

Figure 3:
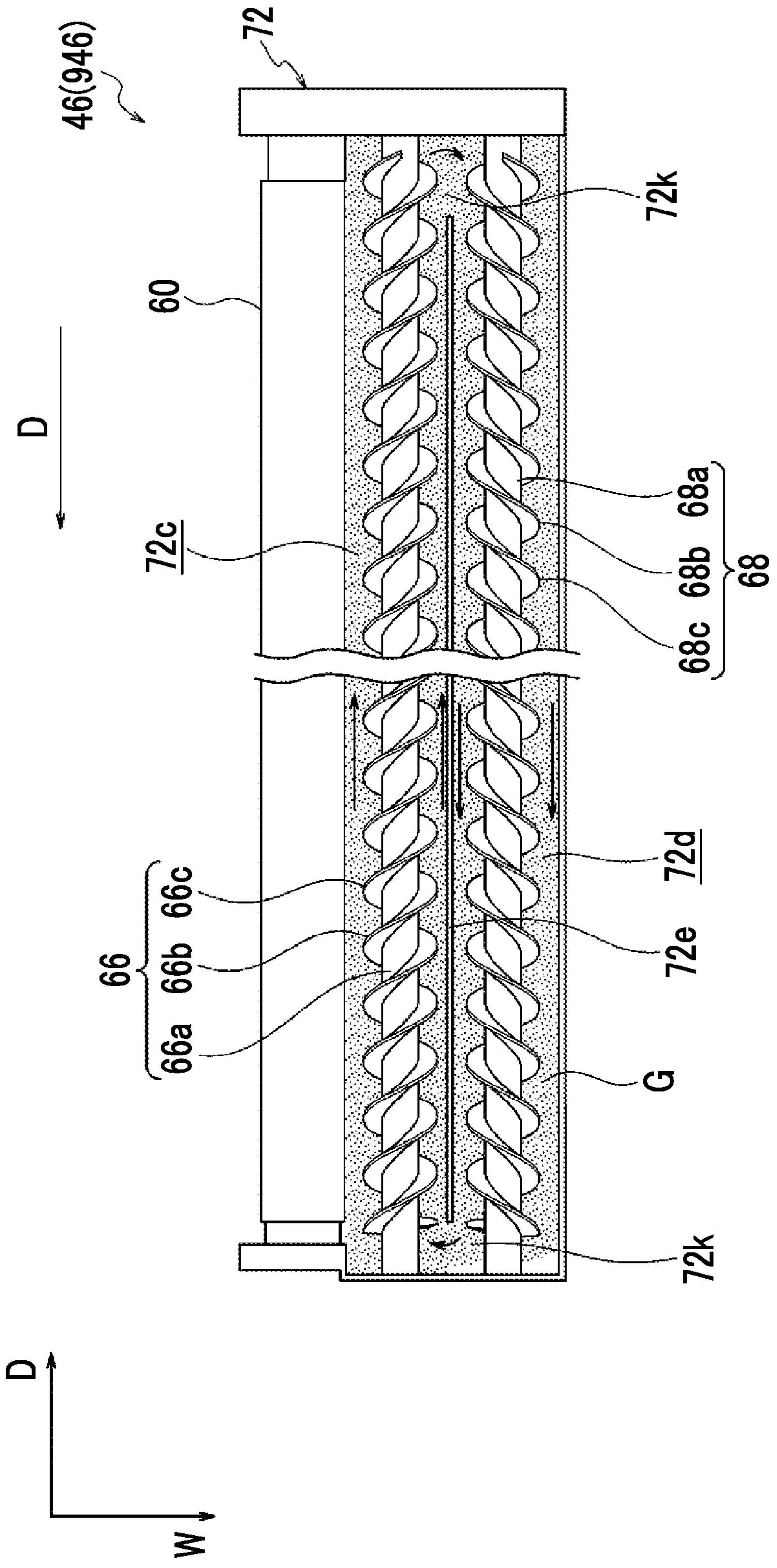
FIG. 3 is an arrow view illustrating a flow and the like of a developer of the developing device according to the exemplary embodiment of the present disclosure.

As illustrated in FIG. 2, the supply path 72*c* and the agitating path 72*d* have a U-shaped cross-section shape. Further, the partition wall 72*e* obliquely extends upward as viewed from the apparatus depth direction, and as illustrated in FIG. 3, the supply path 72*c* and the agitating path 72*d* are separated from each other except for a portion of the supply path 72*c* on the depth side in the apparatus depth direction and a portion of the supply path 72*c* on the front side in the apparatus depth direction. FIG. 3 is a diagram of an inside of the housing 72 of the developing device 46 from a direction in which the partition wall 72*e* of the developing device 46 illustrated in FIG. 2 extends (arrow J01 in FIG. 3).

Further, as illustrated in FIG. 2, a stepped surface 72*f* facing the developing roll 60 side is formed above the supply path 72*c* on an inner wall surface of the housing 72. Further, a layer thickness regulating plate 74 for regulating a layer thickness of the developer G is disposed at a lower portion of the delivery path 72*b*.

Developing Roll 60

The developing roll 60 is disposed in the delivery path 72*b* as illustrated in FIG. 2 with an axial direction as the apparatus depth direction. Further, a gap (development gap) for delivering the developer G from the developing roll 60 to the image holding body 40 is formed between the developing roll 60 and the image holding body 40.

The developing roll 60 includes a magnet roll 60*a* having a circular cross-section shape and a rotary sleeve 60*b* that is placed on the magnet roll 60*a* and rotates around the magnet roll 60*a*. A rotational force is transmitted from a driving source (not illustrated), so that the rotary sleeve 60*b* rotates in a counterclockwise direction.

Further, the magnet roll 60*a* has a total of five magnetic poles of poles N1 and N2 of N polarity and poles S1, S2, and S3 of S polarity, and the five magnetic poles are arranged at intervals determined in order of S1, N1, S2, S3, and N2 in a circumferential direction.

Specifically, the developing pole S1 is disposed at a position facing the image holding body 40, and the regulating pole N2 for regulating the layer thickness of the developer G is disposed on an upstream side of the developing pole S1 in a rotation direction of the developing roll 60.

Further, the peeling pole S2 and the pumping pole S3 are disposed on a downstream side of the developing pole S1 and on an upstream side of the regulating pole N2, and the transport pole N1 is disposed between the developing pole S1 and the peeling pole S2.

With this configuration, the developer G stuck on a surface of the rotary sleeve 60*b* in the vicinity of the pumping pole S3 is transported to the regulating pole N2→the developing pole S1→the transport pole N1. When passing through the regulating pole N2, a layer thickness of the developer G is made uniform by the layer thickness regulating plate 74, the non-magnetic toner T on a magnetic brush is transferred to the image holding body 40 in the vicinity of the developing pole S1, and the magnetic brush, which is almost only the magnetic carrier, remains on the surface of the rotary sleeve 60*b*. As the rotary sleeve 60*b* rotates, the magnetic brush, which is only the magnetic carrier, is released from the surface of the rotary sleeve 60*b* at the peeling pole S2 and scatters to the supply auger 66 side.

Supply Auger 66

As illustrated in FIG. 2, the supply auger 66 is disposed at the supply path 72*c* with an axial direction as the apparatus depth direction. As illustrated in FIG. 3, the supply auger 66 includes a supply shaft 66*a* extending in the apparatus depth direction, and two spiral supply blades 66*b* and 66*c* formed on an outer peripheral surface of the supply shaft 66*a*.

Both end portions of the supply shaft 66*a* are rotatably supported by the wall portion of the housing 72, and a gear (not illustrated) to which the rotational force is transmitted from the driving source is fixed to one end portion of the supply shaft 66*a*.

In this configuration, the rotating supply auger 66 agitates the developer G in the supply path 72*c* and transports the developer G from the front side (left side FIG. 3) in the apparatus depth direction to the depth side (right side in FIG. 3) in the apparatus depth direction to supply the developer G to the developing roll 60. Further, the rotating supply auger 66 delivers the developer G to the agitating auger 68 through the communication passage 72*k* on the depth side in the apparatus depth direction.

Agitating Auger

The agitating auger 68 is disposed at the agitating path 72*d*, as illustrated in FIG. 2 with an axial direction as the apparatus depth direction. As illustrated in FIG. 3, the agitating auger 68 includes an agitating shaft 68*a* extending in the apparatus depth direction and two spiral agitating blades 68*b* and 68*c* formed on an outer peripheral surface of the agitating shaft 68*a*.

Both end portions of the agitating shaft 68*a* are rotatably supported by the wall portion of the housing 72, and a gear (not illustrated) to which the rotational force is transmitted from the driving source is fixed to one end portion of the agitating shaft 68*a*.

In this configuration, the rotating supply auger 66 and the rotating agitating auger 68 transports the developer G, and the developer G circulates between the supply path 72*c* and the agitating path 72*d* (see arrow in FIG. 3).

Restraining Member 80

Figure 4:
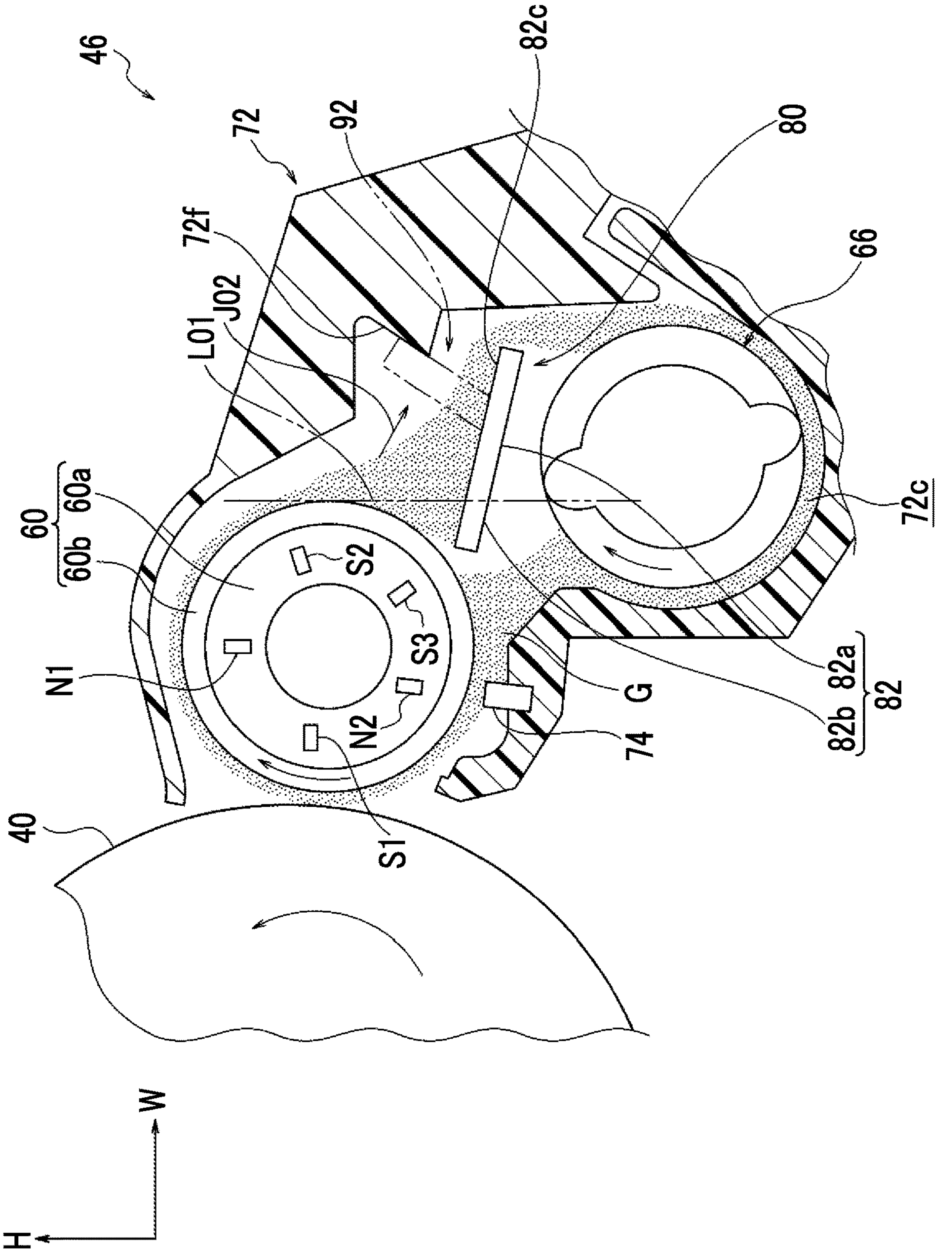
FIG. 4 is an enlarged cross-sectional view illustrating the developing device according to the exemplary embodiment of the present disclosure.

The restraining member 80 extends in the apparatus depth direction, and is disposed inside the housing 72 and above (directly above) the supply auger 66, as illustrated in FIG. 4.

The restraining member 80 includes a restraining plate 82 having a plate thickness direction in an upward-downward direction, and a support portion 92 that supports the restraining plate 82.

Restraining Plate 82

As illustrated in FIG. 4, the restraining plate 82 is disposed so as to straddle a tangent line L01 extending in the upward-downward direction in contact with a portion of the developing roll 60 on the supply auger 66 side, as viewed from the apparatus depth direction. Here, a portion of the restraining plate 82, which is away from the developing roll 60 with respect to the tangent line L01, is referred to as one portion 82*a*, and a portion of the restraining plate 82, which is closer to the developing roll 60 with respect to the tangent line L01, is referred to as the other portion 82*b*. The restraining plate 82 is formed of the one portion 82*a* and the other portion 82*b*. The one portion 82*a* is an example of an upper member, and the other portion 82*b* is an example of a plate portion.

The restraining plate 82 is tilted such that an opposite side to the developing roll 60 faces downward, as viewed from the apparatus depth direction. In other words, the upper surface 82*c* of the restraining plate 82 facing upward is tilted such that an opposite side to the developing roll 60 faces downward, as viewed from the apparatus depth direction.

In addition, a space is formed between one end portion of the restraining plate 82 in the apparatus width direction (right end in FIG. 4) and the inner wall surface of the housing 72. Further, a gap is formed between the other end portion of the restraining plate 82 in the apparatus width direction (left end in FIG. 4) and the developing roll 60. A portion of the developing roll 60 facing the other end portion of the restraining plate 82 is disposed on a downstream side of the peeling pole S2.

Support Portion 92

Figure 5:
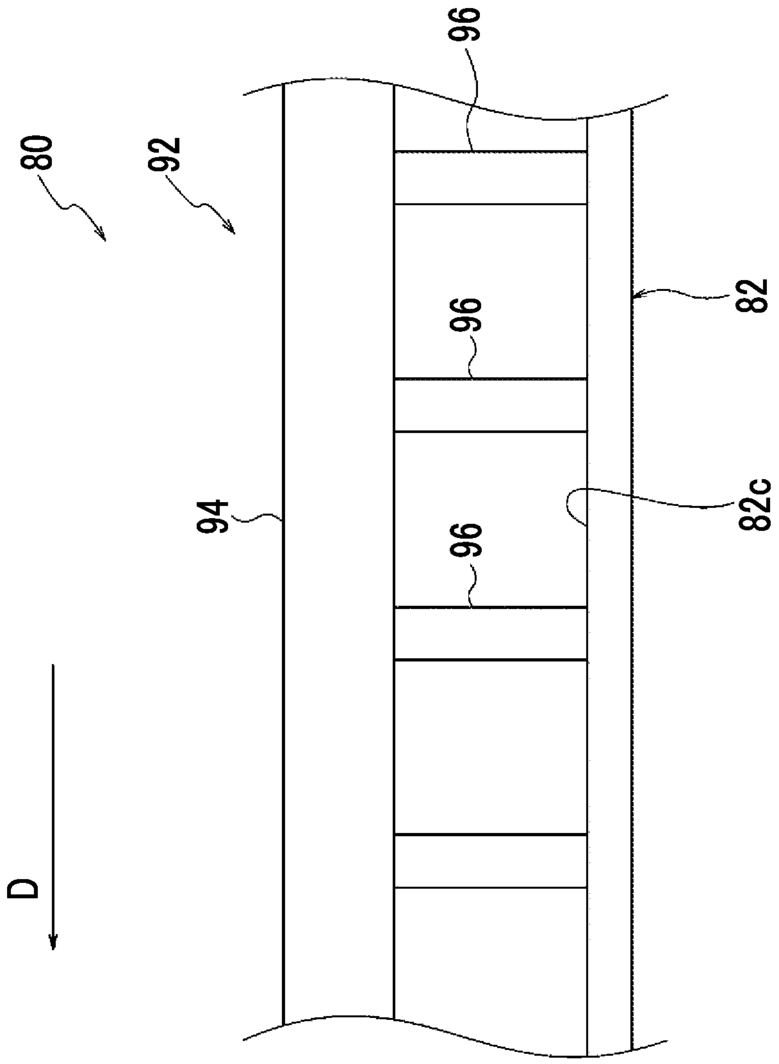
FIG. 5 is a front view illustrating a restraining member of the developing device according to the exemplary embodiment of the present disclosure.

As illustrated in FIG. 4, the support portion 92 is tilted such that an upper end of the support portion 92 is away from the developing roll 60 with respect to a lower end of the support portion 92, as viewed from the apparatus depth direction. As viewed from a direction orthogonal to a direction in which the support portion 92 is tilted (the direction of the arrow J02 illustrated in FIG. 4), the support portion 92 has a main body portion 94 extending in the apparatus depth direction and a plurality of extension portions 96 extending from the main body portion 94 to the restraining plate 82, as illustrated in FIG. 5. The plurality of extension portions 96 are provided at intervals determined in the apparatus depth direction, and a lower end portion of the extension portion 96 is coupled to the upper surface 82*c* of the restraining plate 82.

Figure 6:
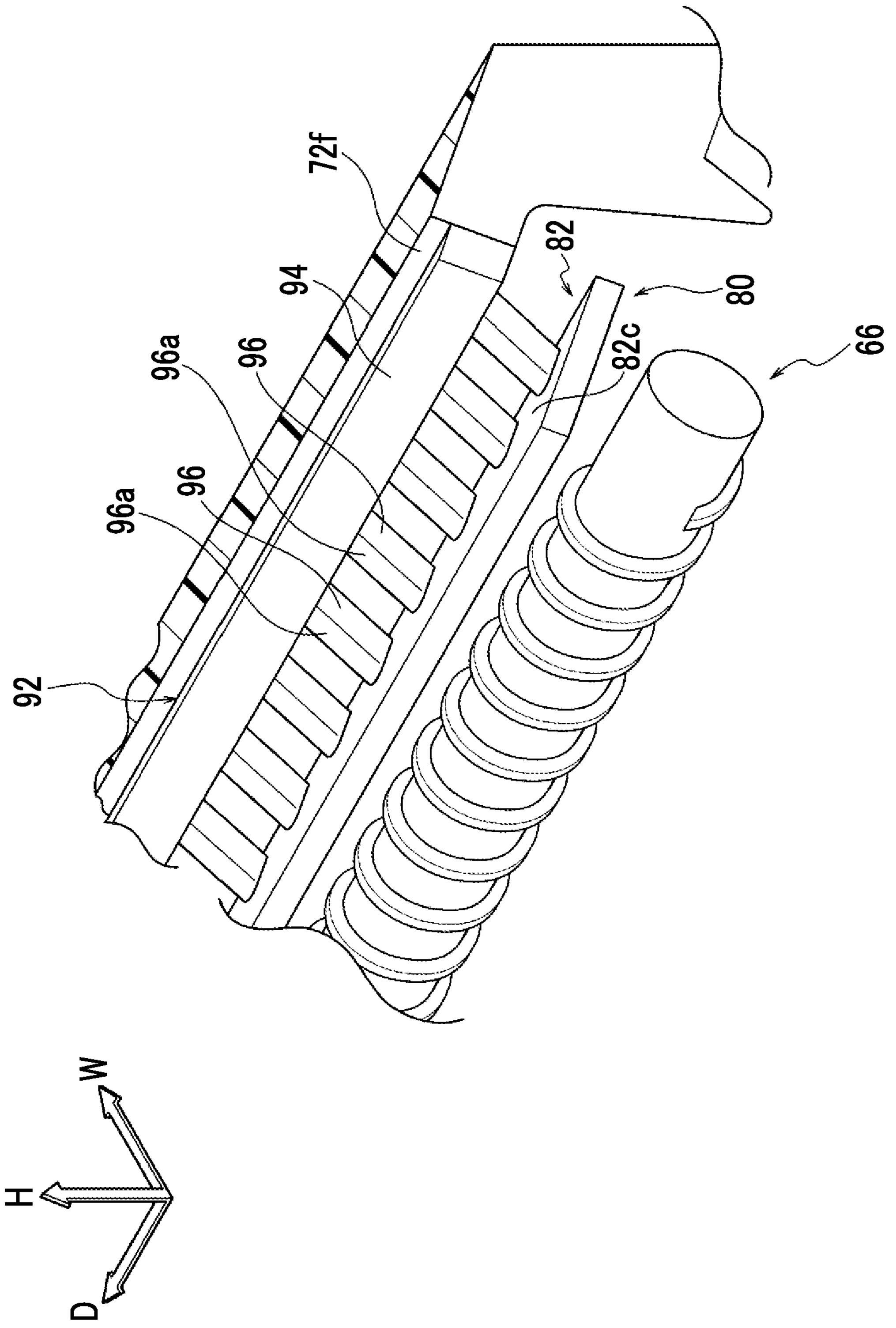
FIG. 6 is a perspective view illustrating a supply auger and the like of the developing device according to the exemplary embodiment of the present disclosure.

Further, as illustrated in FIG. 6, the extension portion 96 has a plate shape with the apparatus depth direction as a thickness direction, and an end face of the extension portion 96 facing the developing roll 60 (see FIG. 4) side is an arcuate surface 96*a*. In addition, the main body portion 94 is attached to the stepped surface 72*f* (see FIG. 4) of the housing 72.

Action of Central Portion Configuration

Figure 11:
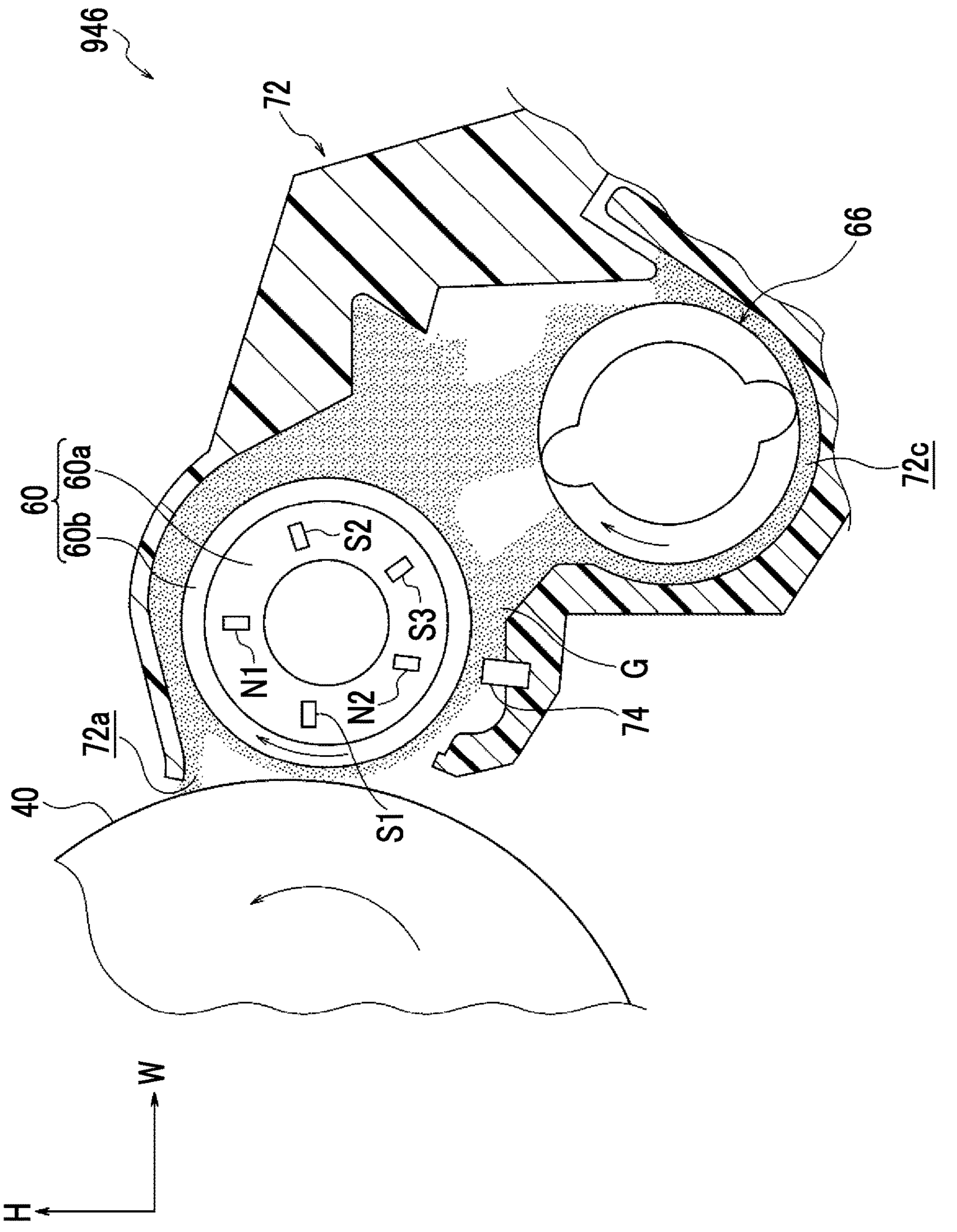
FIG. 11 is an enlarged cross-sectional view illustrating a comparative exemplary embodiment with respect to the developing device according to the exemplary embodiment of the present disclosure.

Next, an action of the developing device 46 will be described. The action of the developing device 46 will be described in comparison with a developing device 946 according to a comparative exemplary embodiment. Unlike the developing device 46, the developing device 946 does not include a restraining member, as illustrated in FIG. 11. Other configurations of the developing device 946 have the same manner as the configurations of the developing device 46.

Inside the housing 72 of the developing devices 46 and 946, the rotating supply auger 66 and agitating auger 68 circulate between the supply path 72*c* and the agitating path 72*d* while agitating the developer G, as illustrated in FIG. 3 (see arrow in FIG. 3). By the developer G being agitated, the toner T and the carrier C in the developer G rub against each other, and the toner T is triboelectrically charged to a predetermined polarity. Further, by operating the developing devices 46 and 946, the atmospheric pressure inside the housing 72 becomes higher than atmospheric pressure outside.

As illustrated in FIGS. 4 and 11, the rotating supply auger 66 supplies the developer G to the developing roll 60. The developer G supplied to the developing roll 60 is held in a state in which a magnetic brush (not illustrated) is formed on a surface of the developing roll 60 by a magnetic force of the magnet roll 60*a*. The rotating rotary sleeve 60*b* transports the developer G.

The rotating rotary sleeve 60*b* transports the developer G to a position facing the image holding body 40. The toner T included in the developer G transported to the position facing the image holding body 40 adheres to an electrostatic latent image formed on the image holding body 40, and the electrostatic latent image is visualized as a toner image. Further, the developer G which passes through a position facing the image holding body 40 and of which a proportion of the toner T is decreased is transported by the rotating rotary sleeve 60*b*, and is released from the developing roll 60 and scatters to the supply auger 66 side by the centrifugal force of the rotary sleeve 60*b*, at a portion facing the peeling pole S2.

Here, the developing device 946 according to the comparative exemplary embodiment does not include a restraining member. In other words, there is only a space between the developing roll 60 and the supply auger 66. Therefore, in the developing device 946, as illustrated in FIG. 11, most of the developer G released from the developing roll 60 collides with the developer G transported by the supply auger 66, and cloud toner is generated. The cloud toner rides on an air flow, and is output to an outside through the opening portion 72*a* of the housing 72. The cloud toner is toner that floats in the air.

Further, a part of the developer G released from the developing roll 60 is supplied again to the developing roll 60 by a magnetic force of the pumping pole S3. In the developer G supplied again, the proportion of the toner T is decreased. Therefore, the electrostatic latent image of the image holding body 40 is visualized by the developer G in which the proportion of the toner T is reduced, so that a decrease in concentration of the visualized toner image occurs.

On the other hand, the developing device 46 according to the exemplary embodiment includes the restraining member 80. Therefore, in the developing device 46, as illustrated in FIG. 4, most of the developer G released from the developing roll 60 collides with the one portion 82*a* of the restraining plate 82. The most of the developer G slides on the upper surface 82*c* of the restraining plate 82, passes between the extension portions 96 (see FIG. 6) arranged at intervals in the apparatus depth direction, and falls and returns from one end portion of the restraining plate 82 to the supply path 72*c*.

Further, a part of the developer G released from the developing roll 60 collides with the other portion 82*b* of the restraining plate 82. Therefore, it is restrained that the part of the developer G is supplied again to the developing roll 60 by the magnetic force of the pumping pole S3, and the part of the developer G slides on the upper surface 82*c* of the restraining plate 82 in the apparatus depth direction, passes between the extension portions 96 (see FIG. 6) arranged at intervals, and falls and returns from one end portion of the restraining plate 82 to the supply path 72*c*.

Summary

As described above, in the developing device 46, the restraining plate 82 is disposed above the supply auger 66. Most of the developer G released from the developing roll 60 collides with the one portion 82*a* of the restraining plate 82. This restrains the developer G released from the developing roll 60 from colliding with the developer G transported by the supply auger 66.

Further, in the developing device 46, the restraining plate 82 has a plate shape extending in the apparatus depth direction and the plate surface facing in the upward-downward direction. That is, the one portion 82*a* of the restraining plate 82 also has a plate shape that extends in the apparatus depth direction and a plate surface facing in the upward-downward direction.

Further, in the developing device 46, the restraining plate 82 is tilted with respect to the horizontal direction, as viewed from the apparatus depth direction. That is, the one portion 82*a* of the restraining plate 82 is also tilted with respect to the horizontal direction, as viewed from the apparatus depth direction. Therefore, the deposition of the developer G on the one portion 82*a* of the restraining plate 82 is restrained, as compared with a case where the one portion of the restraining plate extends in the horizontal direction as viewed from the apparatus depth direction.

Further, in the developing device 46, the restraining plate 82 is tilted such that an opposite side to the developing roll 60 faces downward, as viewed from the apparatus depth direction. That is, the one portion 82*a* of the restraining plate 82 is also tilted such that an opposite side to the developing roll 60 faces downward, as viewed from the apparatus depth direction. Therefore, the developer G which collides with the one portion 82*a* of the restraining plate 82 is restrained from sliding toward the developing roll 60 side and adhering to the developing roll 60, as compared with a case where the developing roll 60 side is tilted to face downward.

Further, in the developing device 46, the one portion 82*a* of the restraining plate 82 is the restraining plate 82 at a portion away from the developing roll 60 with respect to the tangent line L01, as viewed from the apparatus depth direction. In other words, the one portion 82*a* extends to the tangent line L01.

Further, in the developing device 46, the other portion 82*b* of the restraining plate 82 is the restraining plate 82 at a portion closer to the developing roll 60 with respect to the tangent line L01. In other words, the other portion 82*b* is coupled to the one portion 82*a*, as viewed from the apparatus depth direction. Therefore, it is restrained that the developer G released from the developing roll 60 adheres to the developing roll 60 between the developing roll and the supply auger, as compared with a case where the developing roll side has only a space with the tangent line L01.

Further, in the developing device 46, the developer G released from the developing roll 60 is restrained from adhering to the developing roll 60, so that occurrence of white streaks in the visualized toner image is restrained, as compared with a case where there is only a space between the one portion 82*a* and the developing roll 60.

Further, in the developing device 46, the restraining plate 82 is tilted such that an opposite side to the developing roll 60 faces downward, as viewed from the apparatus depth direction. That is, the other portion 82*b* of the restraining plate 82 is also tilted such that an opposite side to the developing roll 60 faces downward, as viewed from the apparatus depth direction. Therefore, the deposition of the developer G on the other portion 82*b* of the restraining plate 82 is restrained, as compared with a case where the other portion of the restraining plate extends in the horizontal direction as viewed from the apparatus depth direction.

Further, as compared with a case where the developing device 946 according to the comparative exemplary embodiment is provided, with the image forming apparatus 10, by restraining cloud toner in the apparatus main body 10*a* of the image forming apparatus 10 from being output from the developing device 46, contamination of the apparatus main body 10*a* of the image forming apparatus 10 is restrained.

MODIFICATION EXEMPLARY EMBODIMENT

Next, a plurality of modification exemplary embodiments to the present exemplary embodiment will be described.

First Modification Exemplary Embodiment

Figure 7B:
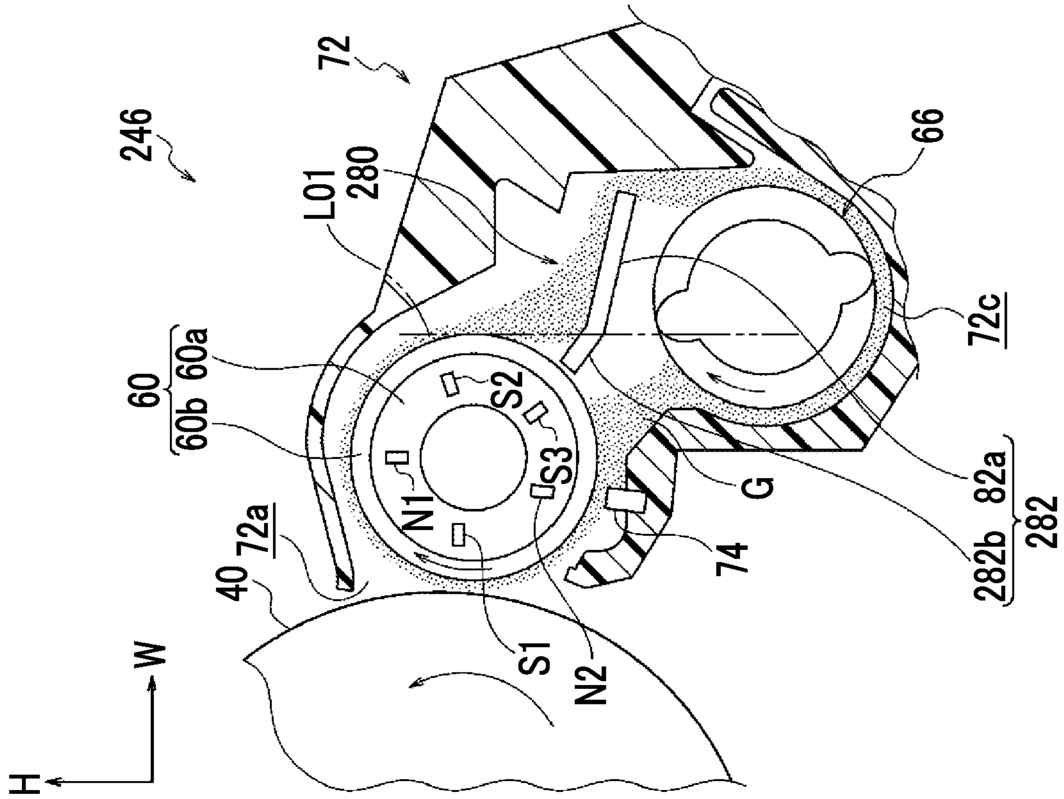
FIGS. 7A and 7B are enlarged cross-sectional views illustrating a modification exemplary embodiment of the developing device according to the exemplary embodiment of the present disclosure.
Figure 7A:
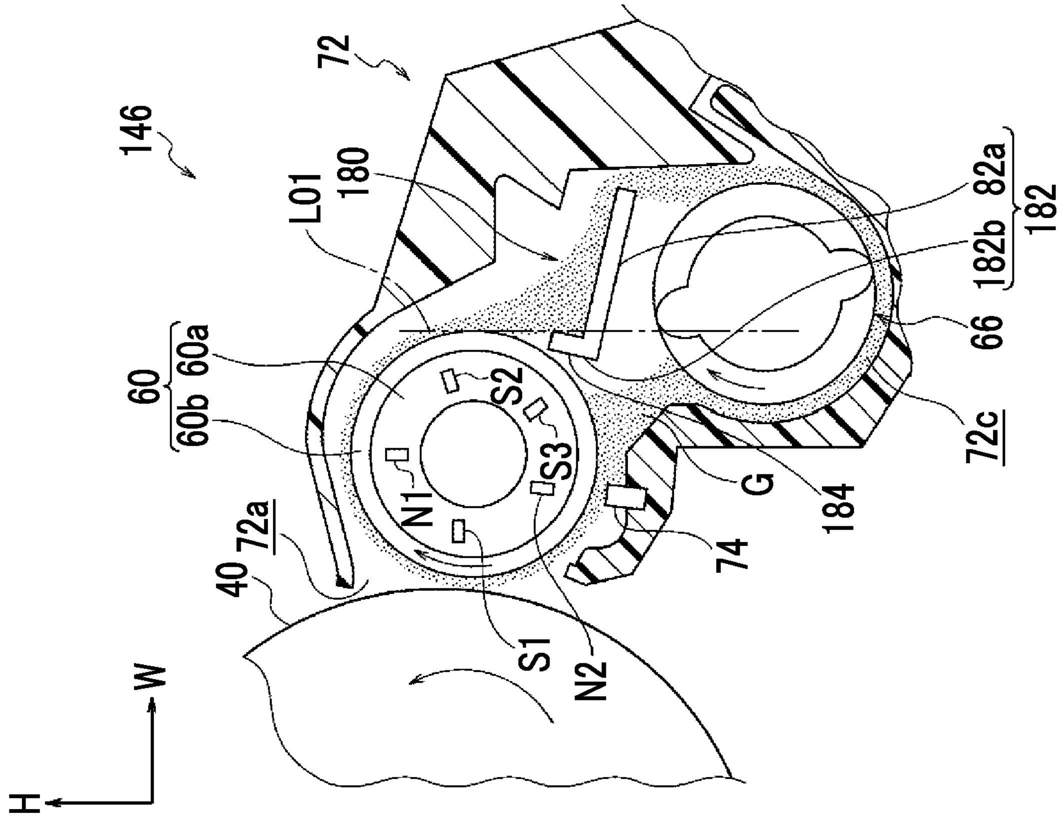

Regarding a developing device 146 according to a first modification exemplary embodiment, portions different from the developing device 46 will generally be described. As illustrated in FIG. 7A, a restraining member 180 of the developing device 146 includes a restraining plate 182. The restraining plate 182 is attached to an inner wall of the housing 72 at both end portions in the apparatus depth direction.

Further, the restraining plate 182 is formed of one portion 82*a* and the other portion 182*b*. The other portion 182*b* has an L-shaped cross-section shape. Specifically, the other portion 182*b* is formed with a partition plate 184 that separates a space between the developing roll 60 and the supply auger 66 in the apparatus width direction. The partition plate 184 extends in the upward-downward direction, and is tilted with respect to the vertical direction such that a lower end is located on the developing roll 60 side with respect to an upper end.

The partition plate 184 restrains the developer G released from the developing roll 60 from adhering to the developing roll 60. By restraining the adhesion to the developing roll 60, it is possible to restrain occurrence of a decrease in concentration in the toner image visualized by the developing device 146.

Second Modification Exemplary Embodiment

Regarding a developing device 246 according to a second modification exemplary embodiment, portions different from the developing device 46 will generally be described. As illustrated in FIG. 7B, a restraining member 280 of the developing device 246 includes a restraining plate 282. The restraining plate 282 is attached to an inner wall of the housing 72 at both end portions in the apparatus depth direction.

Further, the restraining plate 282 is formed of one portion 82*a* and the other portion 282*b*. A tilt angle of the other portion 282*b* which is tilted with respect to the horizontal direction is larger than a tilt angle of the one portion 82*a*. In other words, the tilt angle of the one portion 82*a* is smaller than the tilt angle of the other portion 282*b*.

Here, the developer G which collides with the other portion 282*b* slides on the one portion 82*a* having the reduced tilt angle, and then falls and returns from one end portion of the restraining plate 282 to the supply path 72*c*. In this manner, the developer G slides on the one portion 82*a* having the reduced tilt angle, and then falls from the one end portion of the restraining plate 282 to the supply path 72*c*, so that a falling speed of the developer G falling into the supply path 72*c* becomes slower, as compared with a case where the tilt angle of the other portion 282*b* is maintained.

Further, an end portion of the other portion 282*b* on the developing roll 60 side is located above an end portion of the other portion 82*b* on the developing roll 60 side according to the exemplary embodiment. Therefore, the developer G which collides with the other portion 282*b* is restrained from adhering to the developing roll 60. By restraining the adhesion to the developing roll 60, it is possible to restrain occurrence of a decrease in concentration in the toner image visualized by the developing device 246.

Third Modification Exemplary Embodiment

Figure 8B:
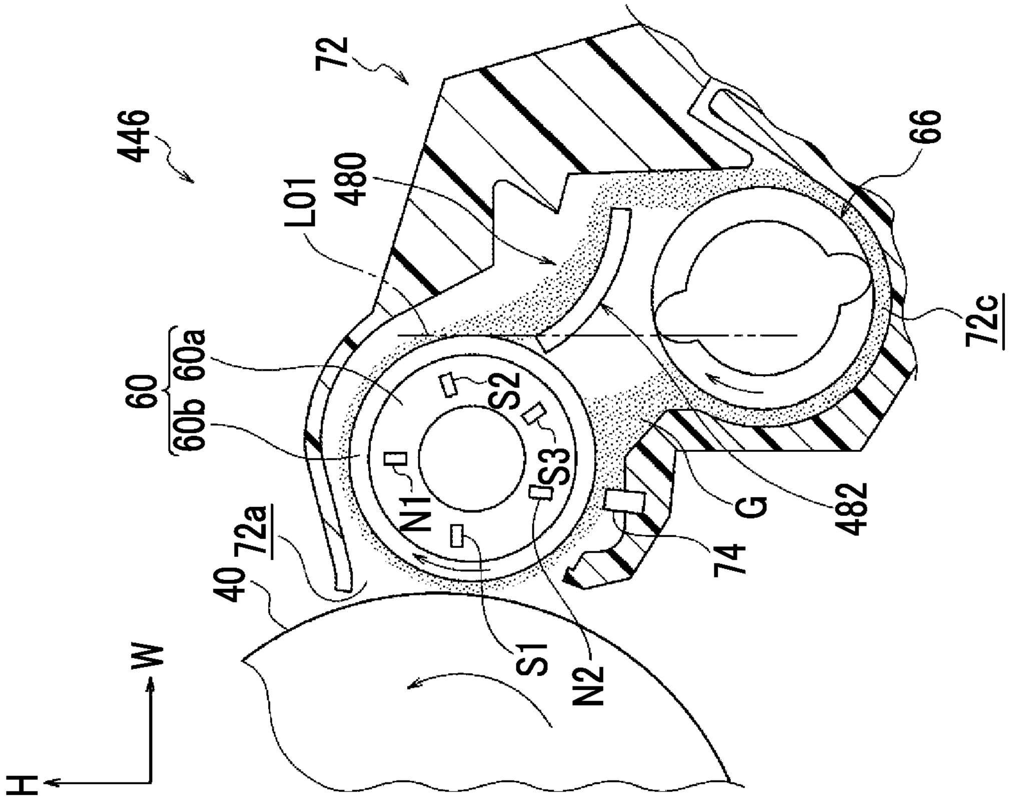
FIGS. 8A and 8B are enlarged cross-sectional views illustrating another modification exemplary embodiment of the developing device according to the exemplary embodiment of the present disclosure.
Figure 8A:
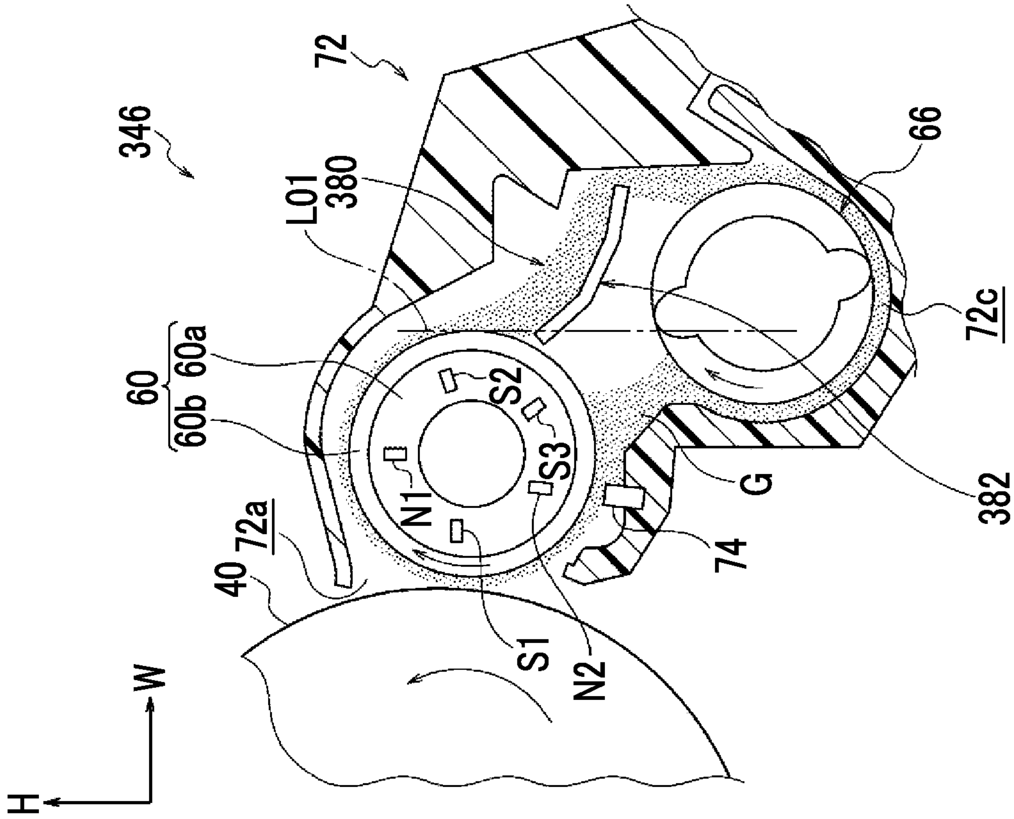

Regarding a developing device 346 according to a third modification exemplary embodiment, portions different from the developing device 246 according to the second modification exemplary embodiment will be generally described. As illustrated in FIG. 8A, a restraining member 380 of the developing device 346 includes a restraining plate 382.

Further, one end portion of the restraining plate 382 is lower than the other end portion of the restraining plate 382.

The restraining plate 382 has a tilt angle, which is changed in three stages, and the tilt angle is decreased in stages from a portion closest to the developing roll 60. Therefore, a sliding speed of the developer G sliding on the restraining plate 382 is reduced in stages. Other actions and effects have the same manner as the actions and effects in the second modification exemplary embodiment.

Fourth Modification Exemplary Embodiment

Regarding a developing device 446 according to a fourth modification exemplary embodiment, portions different from the developing device 346 described in the third modification exemplary embodiment will be generally described. As illustrated in FIG. 8B, a restraining member 480 of the developing device 446 includes a restraining plate 482.

Further, one end portion of the restraining plate 482 is lower than the other end portion of the restraining plate 482. A tilt angle is gradually changed. Specifically, the restraining plate 482 is curved, as viewed from the apparatus depth direction. Therefore, a sliding speed of the developer G sliding on the restraining plate 482 is gradually reduced. Other actions and effects have the same manner as the actions and effects in the third modification exemplary embodiment.

Fifth Modification Exemplary Embodiment

Figure 9:
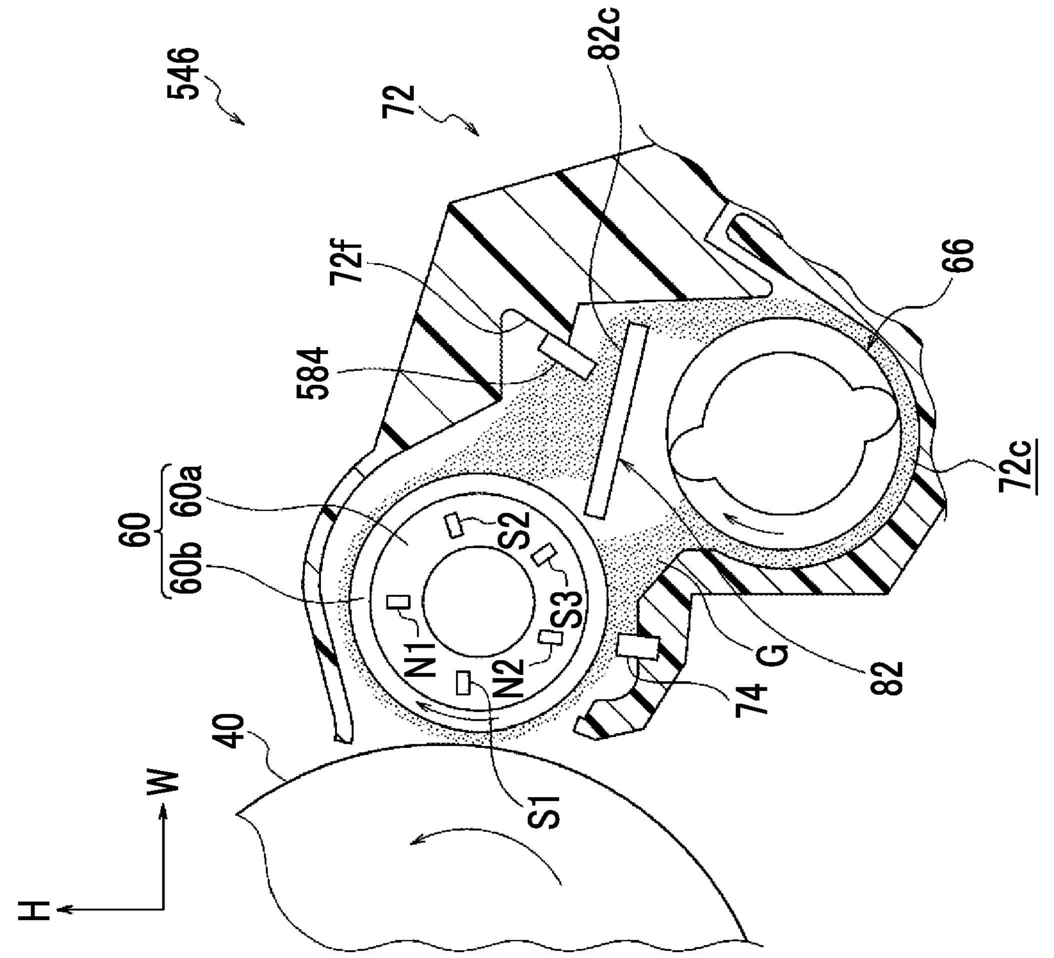
FIG. 9 is an enlarged cross-sectional view illustrating still another modification exemplary embodiment of the developing device according to the exemplary embodiment of the present disclosure.

Regarding a developing device 546 according to a fifth modification exemplary embodiment, portions different from the developing device 46 will generally be described. As illustrated in FIG. 9, the developing device 546 includes the restraining plate 82 and a collision plate 584. The restraining plate 82 is attached to an inner wall of the housing 72 at both end portions in the apparatus depth direction.

The collision plate 584 extends in the apparatus depth direction, and has a rectangular-shaped cross-section shape. The collision plate 584 is attached to the stepped surface 72*f* of the housing 72 in a cantilevered state.

In this configuration, a part of the developer G released from the developing roll 60 collides with the collision plate 584. The developer G of which a speed is reduced due to the collision falls into the supply path 72*c* via the restraining plate 82.

Sixth Modification Exemplary Embodiment

Figure 10B:
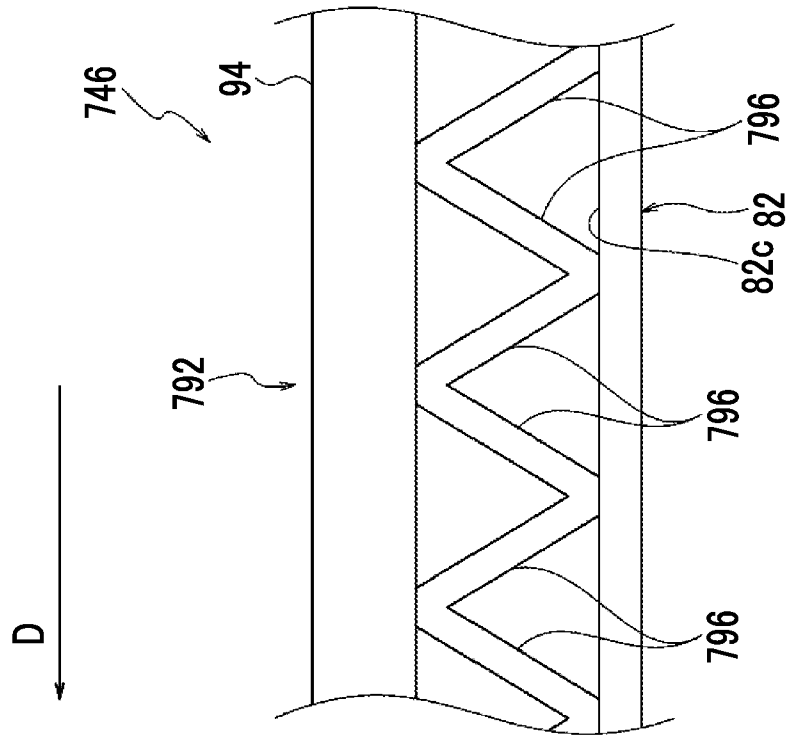
FIGS. 10A and 10B are diagrams illustrating still another modification exemplary embodiment of the developing device according to the exemplary embodiment of the present disclosure.
Figure 10A:
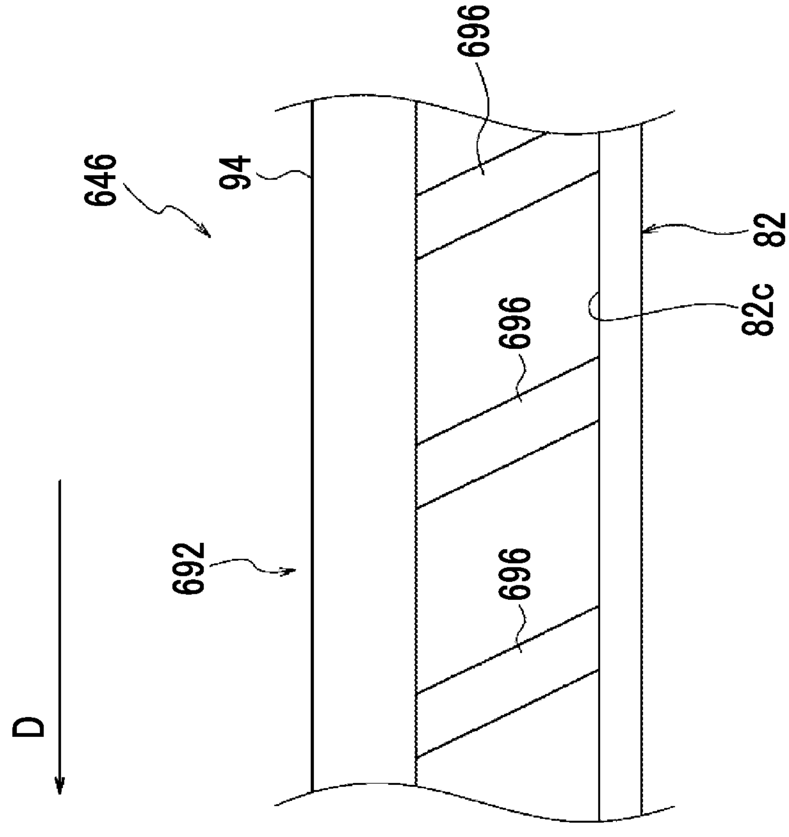

Regarding a developing device 646 according to a sixth modification exemplary embodiment, portions different from the developing device 46 will be generally described. As illustrated in FIG. 10A, a support portion 692 of the developing device 646 includes the main body portion 94 and a plurality of extension portions 696.

The extension portion 696 is tilted such that an upper end portion is on the depth side with respect to a lower end portion in the apparatus depth direction. With the tilt in this manner, the deposition of the developer G on an end surface of the extension portion 696 facing the developing roll 60 (see FIG. 4) side is restrained, as compared with a case where the upper end portion and the lower end portion are at the same position in the apparatus depth direction.

Seventh Modification Exemplary Embodiment

Regarding a developing device 746 according to a seventh modification exemplary embodiment, portions different from the developing device 46 will be generally described. As illustrated in FIG. 10B, a support portion 792 of the developing device 746 includes the main body portion 94 and a plurality of extension portions 796.

The extension portion 796 has an upper end portion and a lower end portion having a staggered shape in the apparatus depth direction. In other words, the extension portions 796 are arranged in a zigzag shape. By arranging the extension portions 796 in the zigzag shape in this manner, the deposition of the developer G on an end surface of the extension portion 796 facing the developing roll 60 (see FIG. 4) side is restrained, as compared with a case where the upper end portion and the lower end portion are at the same position in the apparatus depth direction.

Although the specific exemplary embodiments of the present disclosure are described in detail, the exemplary embodiment of the present disclosure is not limited to such exemplary embodiments, and it is apparent to those skilled in the art that various other exemplary embodiments can be taken within the scope of the present disclosure. For example, in the exemplary embodiment described above, the restraining plate 82 has a plate shape, and may have a mesh or the like. In this case, the action of forming the plate shape does not work.

Further, in the exemplary embodiment described above, the restraining plate 82 is tilted, and may be horizontal. In this case, the action of tilting the restraining plate does not work.

Further, in the exemplary embodiment described above, the one portion 82*a* extends to the tangent line L01, and the one portion may be separated from the tangent line L01. In this case, the action of extending the one portion 82*a* to the tangent line L01 does not work.

Further, in the exemplary embodiment described above, the restraining plate 82 has the other portion 82*b*, and the restraining plate may be configured with only one portion. In this case, the action of having the other portion does not work.

Further, although not particularly described in the exemplary embodiment described above, a change in the amount of cloud toner in the present exemplary embodiment is derived by measuring the amount of cloud toner output from the opening portion 72*a* of the housing 72.

Further, although not particularly described in the exemplary embodiment described above, a position of the restraining plate 82 in the upward-downward direction is preferably disposed downward not to hit the supply auger 66, for example. Therefore, the speed of the developer G when the developer G falls from the restraining plate 82 and collides with the developer G in the supply path 72*c* is reduced.

Further, although not particularly described in the exemplary embodiment described above, the tilt angle of the restraining plate 82 is preferably approximately 20 degrees with respect to the horizontal direction, for example, from the viewpoint of sliding the developer G which collides with the restraining plate 82 and from the viewpoint of reducing the speed of the developer G falling from the restraining plate 82.

Further, in the exemplary embodiment described above, an end surface of the extension portion 96 facing the developing roll 60 side is the arcuate surface 96*a*, and the end face may be a V-shaped surface of which a apex faces the developing roll 60 side.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A developing device comprising:
a rotating member that delivers a developer to a latent image of an image holding body while rotating;
a supply member that extends in an axial direction of the rotating member and is disposed diagonally below the rotating member as viewed from the axial direction, transports the developer while rotating, and supplies the developer to the rotating member; and
an upper member disposed on an opposite side of the rotating member with respect to a tangent line extending in an upward-downward direction in contact with a portion of the rotating member on a supply member side and above the supply member, as viewed from the axial direction,
wherein the upper member is further disposed in a space between the rotating member and the supply member in a vertical direction, and
wherein a part of the developer released from the rotating member collides with the upper member.

2. The developing device according to claim 1,
wherein the upper member has a plate shape that extends in the axial direction and has a plate surface facing in the upward-downward direction.

3. The developing device according to claim 2,
wherein the upper member is tilted such that one end portion of the upper member faces downward with respect to the other end portion, as viewed from the axial direction.

4. The developing device according to claim 3,
wherein the upper member is tilted such that an opposite side to the rotating member faces downward, as viewed from the axial direction.

5. The developing device according to claim 4,
wherein the upper member extends to the tangent line.

6. An image forming apparatus comprising:
the developing device according to claim 4 that develops a latent image formed on an image holding body as a toner image; and
a transfer device that transfers the toner image to a recording medium.

7. The developing device according to claim 3,
wherein the upper member extends to the tangent line.

8. An image forming apparatus comprising:
the developing device according to claim 3 that develops a latent image formed on an image holding body as a toner image; and
a transfer device that transfers the toner image to a recording medium.

9. The developing device according to claim 2,
wherein the upper member extends to the tangent line.

10. An image forming apparatus comprising:
the developing device according to claim 2 that develops a latent image formed on an image holding body as a toner image; and
a transfer device that transfers the toner image to a recording medium.

11. The developing device according to claim 1,
wherein the upper member extends to the tangent line.

12. The developing device according to claim 11,
wherein a plate portion that is disposed on a rotating member side with respect to the tangent line and is coupled to the upper member, and has a plate shape extending in the axial direction is provided.

13. The developing device according to claim 12,
wherein the plate portion is tilted such that an opposite side to the rotating member faces downward, as viewed from the axial direction.

14. An image forming apparatus comprising:
the developing device according to claim 1 that develops a latent image formed on an image holding body as a toner image; and
a transfer device that transfers the toner image to a recording medium.

15. A developing device comprising:
a rotating member that delivers a developer to a latent image of an image holding body while rotating;
a supply member that extends in an axial direction of the rotating member and is disposed diagonally below the rotating member as viewed from the axial direction, transports the developer while rotating, and supplies the developer to the rotating member; and
an upper member disposed on an opposite side of the rotating member with respect to a tangent line extending in an upward-downward direction in contact with a portion of the rotating member on a supply member side and above the supply member, as viewed from the axial direction,
wherein the upper member is disposed below a peeling pole of the rotating member in a vertical direction, and
wherein a part of the developer released from the rotating member collides with the upper member.

16. The developing device according to claim 15,
wherein the upper member has a plate shape that extends in the axial direction and has a plate surface facing in the upward-downward direction.

17. The developing device according to claim 16,
wherein the upper member is tilted such that one end portion of the upper member faces downward with respect to the other end portion, as viewed from the axial direction.

18. The developing device according to claim 17,
wherein the upper member is tilted such that an opposite side to the rotating member faces downward, as viewed from the axial direction.

19. The developing device according to claim 18,
wherein the upper member extends to the tangent line.

20. An image forming apparatus comprising:
the developing device according to claim 15 that develops a latent image formed on an image holding body as a toner image; and
a transfer device that transfers the toner image to a recording medium.

* * * * *